United States Patent [19]

Burns et al.

[11] Patent Number: 4,556,293

[45] Date of Patent: Dec. 3, 1985

[54] BROADBAND UNPOLARIZED LIGHT SOURCE

[75] Inventors: William K. Burns, Alexandria, Va.; Robert P. Moeller, Ft. Washington, Md.

[73] Assignee: The United States of America as represented by the Secretary of the Navy, Washington, D.C.

[21] Appl. No.: 490,892

[22] Filed: May 2, 1983

[51] Int. Cl.$^4$ .............................................. G02F 1/01
[52] U.S. Cl. ................................................... 350/400
[58] Field of Search ............... 340/400, 403, 405, 406, 340/96.18

[56] References Cited

U.S. PATENT DOCUMENTS 3,404,353 10/1968 Harris et al. ............................. 332/1
3,433,553 3/1969 Peters ..................................... 350/157
3,512,868 5/1970 Gorkiewicz et al. ................ 350/157

OTHER PUBLICATIONS

Stone, J. M., *Radiation and Optics*, McGraw Hill, 1963, pp. 302–311.
Lu, et al., "Depolarization of White Light by a Birefringent Crystal", JOSA, vol. 65, No. 3, Mar. 1975, pp. 248–251.
Maeda, et al., "Buried–Heterostructure Laser Packaging for Wideband Optical Transmission Systems", IEEE Transactions on Communications, vol. COM–26, No. 7, Jul. 1978, pp. 1076–1081.
Billings, "A Monochromatic Depolarizer", J. of the Optical Soc. of America, vol. 41, No. 11, pp. 966–975 (Dec. 1951).
Sakai et al., "Degree of Polarization in Anisotropic Single–Mode Optical Fibers: Theory", IEEE J. of Q. Elec., vol. QE–18, No. 4, (Apr. 1982).
Böhm et al., "Low–Drift Fibre Gyro Using a Superluminescent Diode", Electronics Letters, vol. 17, No. 10, (May 14, 1981).

*Primary Examiner*—Bruce Y. Arnold
*Attorney, Agent, or Firm*—Robert F. Beers; William T. Ellis; Vincent T. Pace

[57] ABSTRACT

Broadband, unpolarized light is produced by coupling a birefringent optical fiber to a light emitting device, such as a superluminescent diode, which is capable of emitting broadband, partially polarized light. The optical fiber is made sufficiently long to provide an optical differential path length between its birefringent axes which is longer than the coherence length of the light emitting device.

6 Claims, 3 Drawing Figures

BROADBAND UNPOLARIZED LIGHT SOURCE

BACKGROUND OF THE INVENTION

The subject invention relates generally to depolarization of light, and more particularly to an apparatus for producing broadband, unpolarized light.

The use of unpolarized light is of interest in the field of optics, especially in fiber-optic systems, because unpolarized light is relatively immune from randomly induced birefringences which can affect the state of polarization of light that is polarized. Such randomly induced birefringences are often caused by environmental perturbations such as temperature fluctuations or mechanical deformations. In fiber-optic gyroscopes, for example, depolarized and partially polarized light has been used to reduce sensor noise.

While the study of polarized light has drawn considerable attention ever since the time of Huygens, to date little work has been done on the development of unpolarized light sources or means for depolarizing light. Consequently, there is a paucity of information concerning light depolarization and unpolarized light sources having very low degrees of polarization.

Of the known techniques for depolarizing light the most effective are the devices of Lyot and Billings. The Lyot device, disclosed in Ann. Observatoire Astron. Phys. de Paris (Meudon), Tomi i Fasc. 1-28, 102(1928), consists of two quartz plates. These plates are X-cut and one is cut twice as thick as the other. The two plates are aligned parallel to each other such that their respective axes are at an angle of 45 degrees. The Lyot device is most efficient only when depolarizing light having a wide bandwidth. Furthermore, it is a rather bulky optical device because of the use of the retardation plates.

The Billings device is disclosed in Journal of the American Optical Soc., Vol. 41, No. 12, pp. 966-75 (1975). It consists of two variable wave plates of Z-cut, birefringent material. The plates are aligned such that their fast axes are at an angle of 45° to each other. To vary the degree of retardation of the plates an electric field is applied to each plate. The intensity of the applied electric field is adjusted such that the retardation of one plate can be varied from 0 to $2\pi$, and the retardation of the second plate, from 0 to $4\pi$. The Billings depolarizer, however, is an active device requiring a source of electric energy.

U.S. Pat. No. 3,433,553, Peters, discloses a light depolarizer which is passive and suitable for use with both narrow and broadband light. The Peters depolarizer consists of a retardation plate which has one of its surfaces roughened in order to provide a randomly varying thickness. This randomly varying thickness causes the production of a complete set of polarization states from linearly polarized light which is passed through the plate. This device has the disadvantage that the output beam has non-uniform spatial properties, i.e. each part of the beam has a different polarization state. Only when viewing the entire beam does the light appear to be depolarized.

In order to depolarize light which is other than linearly polarized, Peters combines a plurality of the roughened plates, each disposed with its optical axis at an angle to the optical axis of an adjacent plate. It can be readily seen, however, that the degree of depolarization is dependent on the number of plates utilized. Thus, in order to obtain complete depolarization many plates would have to be used resulting in a bulky optical apparatus.

OBJECTS OF THE INVENTION

Accordingly, one object of the subject invention is to generate broadband unpolarized light.

Another object of the invention is to generate broadband, unpolarized light by using compact, readily available components.

It is a further object of this invention to provide unpolarized light in a manner which is suitable for use in fiber-optic gyroscopes.

SUMMARY OF THE INVENTION

The above and other objects are realized in the present invention which comprises an apparatus for producing broadband, unpolarized light. The apparatus includes a light emitting device which is capable of emitting broadband, partially polarized light with its polarized component being a transverse electric component which is linearly polarized. The emitted light is then coupled into a birefringent optical fiber which is rotated such that its birefringence axes are at an angle of approximately 45° to the azimuth of the polarized component of the emitted light. In this manner the light will be totally depolarized within approximately one meter of fiber length.

DETAILED DESCRIPTION OF THE PREFERRED EMBODIMENT

Figure 1:
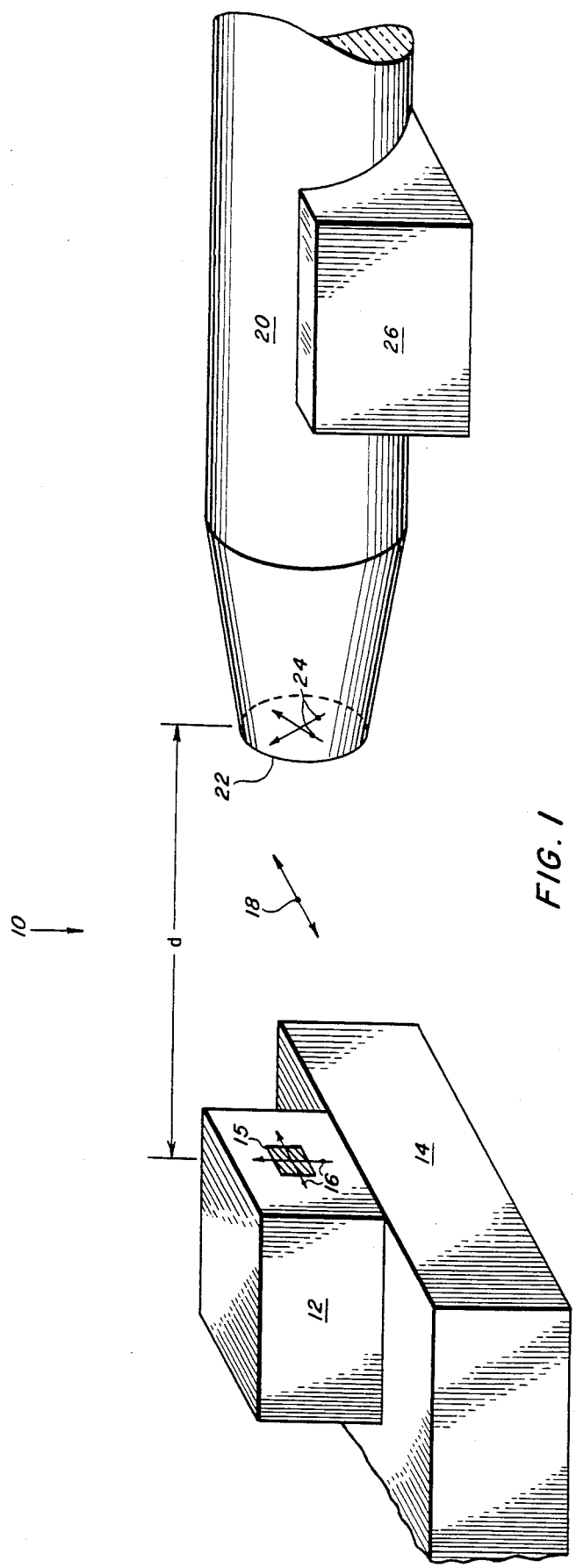
FIG. 1 shows the preferred embodiment of the invention in perspective.

Referring now to the drawings, and more particularly to FIG. 1, there is shown generally a broadband, unpolarized light source 10. This light source 10 includes a light emitting device 12 mounted on a heat sink 14. In the embodiment illustrated in FIG. 1 the light emitting device 12 is realized by a superluminescent diode. However, other types of devices such as laser diodes or multi-mode lasers, which are capable of emitting broadband, partially or completely polarized light whose polarized component is linearly polarized, may also be used.

The light emitting device 12 has an emitting region 15 which has optical axes 16. Light emitted by device 12 has a linearly polarized transverse electric component 18 as represented in FIG. 1.

The unpolarized light source 10 also includes a birefringent optical fiber 20 having an end surface 22. The birefringent optical fiber 20 is coupled to the light emitting device 12 such that the end surface 22 is butted-up against, or placed in very close proximity to the emitting region 15. The smaller the distance d between the emitting device 12 and the fiber end surface 22, the greater will be the coupling efficiency. The coupling efficiency can also be increased by tapering the end of the optical fiber as shown in FIG. 1. The birefringent optical fiber 20 is rigidly mounted in place by means of a mounting device 26.

Highly birefringent optical fiber is now available which holds optical polarization and has a large group delay time difference (ie. $\gtrsim 0.1$ nsec/km). It is known in the art that such a fiber can depolarize broadband light, depending on the orientation and polarization state of the optical input. The inventors have discovered that a linearly polarized broadband input, when coupled into a highly birefringent fiber with the optical azimuth at 45° to the birefringence axes of the fiber, will depolarize within approximately one (1) meter of fiber length. The input light is evenly split between the birefringence axes and the two components see different group velocities corresponding to each axis. When the differential path length exceeds the coherence length of the broadband light, the light is depolarized.

Figure 2:
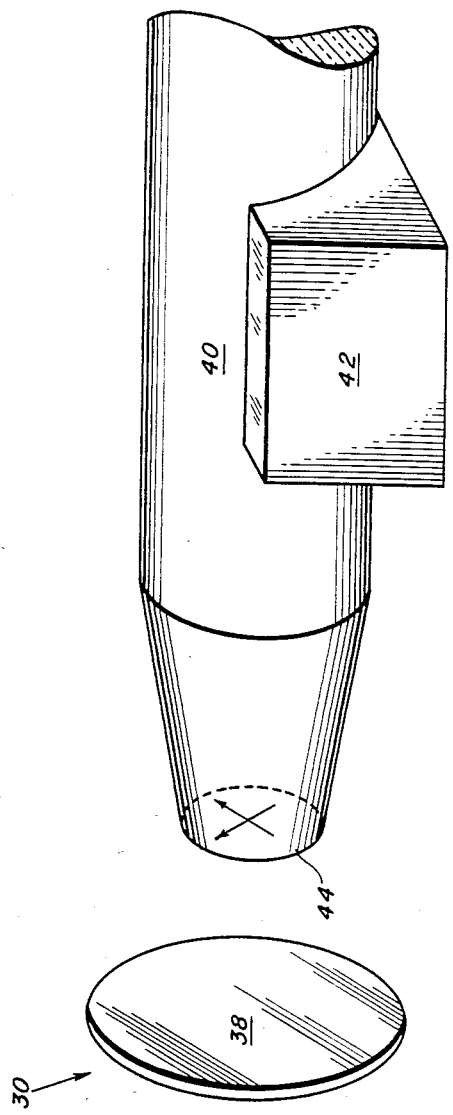
FIG. 2 shows an end view of the light emitting device and surface in adjacent relation to the optical fiber end surface.

Thus, when the birefringent optical fiber 20 in FIG. 1 is coupled to the light emitting device 12, the birefringent optical fiber 20 must be rotated so that the linearly polarized component 18 of the emitted light is at approximately 45° to the birefringence axes 24. This is shown more clearly in FIG. 2 wherein there is shown the light emitting device end surface 52 in adjacent relation to the optical fiber end surface 54. The azimuth of the linearly polarized component 56 is in a plane which is perpendicular to the plane of the end surface 52, and thus also perpendicular to the plane of the fiber end surface 54. The optical fiber has birefringence axes 60 and 62, oriented such that the angle $\alpha$ between the a-axis 60, or the b-axis 62, and the linearly polarized component 56 is approximately 45°.

Figure 3:
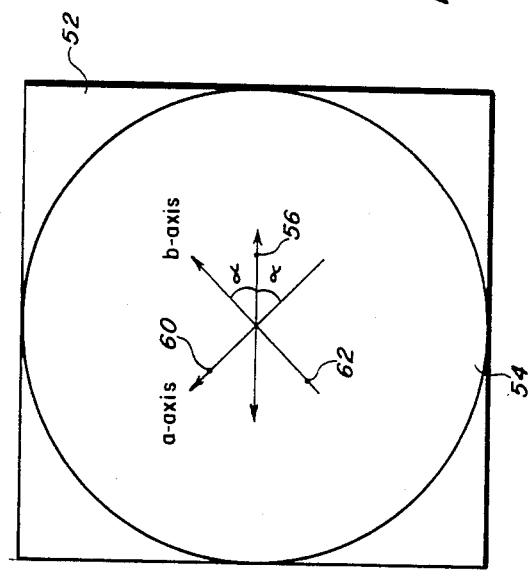
FIG. 3 shows another embodiment of the invention in perspective using an optical lens to couple the light emitting device to the birefringent optical fiber.
Figure 3:
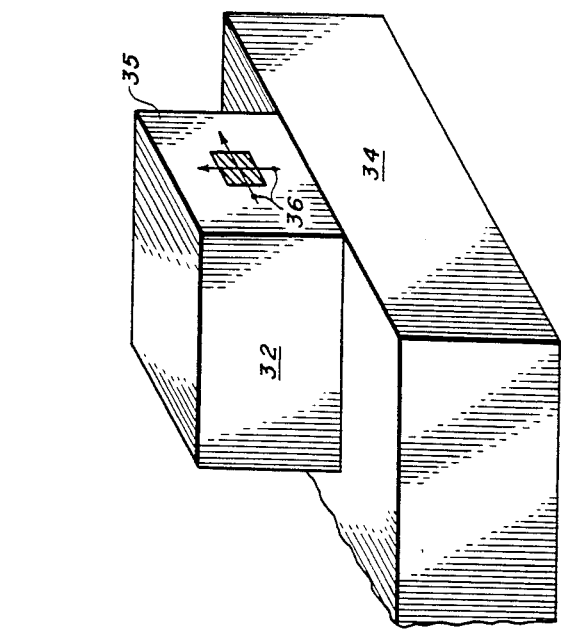

In another emboidment of the unpolarized light source 30, shown in FIG. 3 an optical lens 38 is disposed between the light emitting device 32 and the birefringent optical fiber 40. This lens serves to collimate the light output of the emitting device 32 and focus it into the end 44 of the birefringent optical fiber 40.

It can be seen easily that numerous additional modifications and variations of the subject invention are possible in light of the above teachings. It is therefore to be understood that within the scope of the appended claims, the invention may be practiced otherwise than as specifically described hereinbefore.

What is claimed as new and desired to be secured by Letters Patent of the United States is:

1. An unpolarized light source comprising:
    means for generating a broadband beam of light having a predominant plane of polarization; and
    means for depolarizing said light beam comprising a highly birefringent optical fiber having birefringence axes with different group velocities corresponding to each axis, and one of its ends coupled to said light generating means with each of said birefringance axes orientated approximately 45 degrees away from said predominant plane of polarization of said light generating means, and having a physical length long enough to produce an optical differential path length between said birefringance axes which is longer than the coherence length of said broadband beam of light in said fiber.

2. An unpolarized light source as recited in claim 1 wherein said light generating means comprises a light emitting diode.

3. An unpolarized light source as recited in claim 2 wherein said light emitting diode comprises a laser diode.

4. An unpolarized light source as recited in claim 2 wherein said light emitting diode comprises a superluminescent diode.

5. An unpolarized light source comprising:
    a superluminescent diode capable of generating broadband light which has a predominant plane of polarization; and
    a highly birefringent optical fiber approximately 1 meter or more in length, having a set of birefringence axes with different group velocities corresponding to each axis, said velocities having a group delay line difference greater than or equal to 0.1 nsec/km, said birefringent optical fiber being butt-coupled to said superluminescent diode with said birefringence axes each orientated at an angle of approximately 45 degrees away from said predominant plane of polarization.

6. A method for depolarizing light comprising:
    generating a beam of broadband light having a predominant plane of polarization; and
    coupling said beam of light into a highly birefringent optical fiber haing birefringence axes with different group velocities corresponding to each axis, said axes orientated at an angle of approximately 45 degrees to said predominant plane of polarization; and
    passing said beam of light through said optical fiber until an optical differential path length between said birefringence axes exceeds the coherence length of said broadband beam of light in said fiber.

* * * * *